US007401627B2

(12) United States Patent
Magnus et al.

(10) Patent No.: US 7,401,627 B2
(45) Date of Patent: Jul. 22, 2008

(54) PROTECTION OF A SEAL ELEMENT

(75) Inventors: Heyn Halfdan Magnus, Kongsberg (NO); Petter Støvset, Kongserg (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 401 days.

(21) Appl. No.: 11/099,799

(22) Filed: Apr. 5, 2005

(65) Prior Publication Data
US 2005/0230651 A1   Oct. 20, 2005

(30) Foreign Application Priority Data
Apr. 5, 2004   (NO) .................................. 20041408

(51) Int. Cl.
*F16L 37/34* (2006.01)
*F16L 29/00* (2006.01)
(52) U.S. Cl. ................ 137/614.03; 137/614; 251/149.6
(58) Field of Classification Search ............. 251/149.6, 251/82, 83; 137/614.03–614.04, 860, 614.18, 137/614

See application file for complete search history.

(56) References Cited
U.S. PATENT DOCUMENTS

| | | | | |
|---|---|---|---|---|
| 1,047,774 A | * | 12/1912 | Eynon et al. ........... | 137/614.18 |
| 2,829,670 A | * | 4/1958 | Nix ............................. | 137/628 |
| 3,464,436 A | | 9/1969 | Bruning | |
| 5,123,448 A | | 6/1992 | Kjellberg et al. | |
| 5,159,955 A | * | 11/1992 | Ekman ................... | 137/614.03 |
| 5,732,735 A | * | 3/1998 | Birch .................... | 137/505.11 |
| 6,082,399 A | | 7/2000 | Nyberg | |

FOREIGN PATENT DOCUMENTS

EP   0 621 430 B1   7/1998

\* cited by examiner

*Primary Examiner*—John Rivell
*Assistant Examiner*—Andrew J Rost
(74) *Attorney, Agent, or Firm*—Henry C. Query, Jr.

(57) ABSTRACT

In accordance with the present invention, these and other problems in the prior art are addressed by providing a valve which comprises a valve body which includes an passage that extends at least partially therethrough, a valve seat which is formed in the passage, a valve member which is movably positioned in the passage proximate the valve seat, a first sealing element which is supported on the valve member and which in a closed position of the valve engages the valve seat to block fluid flow through the passage, and a protective member which is movable relative to the valve member between a first position in which the protective member substantially covers the first sealing element when the valve is in the open position and a second position in which the protective member is retracted from the first sealing element when the valve is in the closed position.

15 Claims, 1 Drawing Sheet

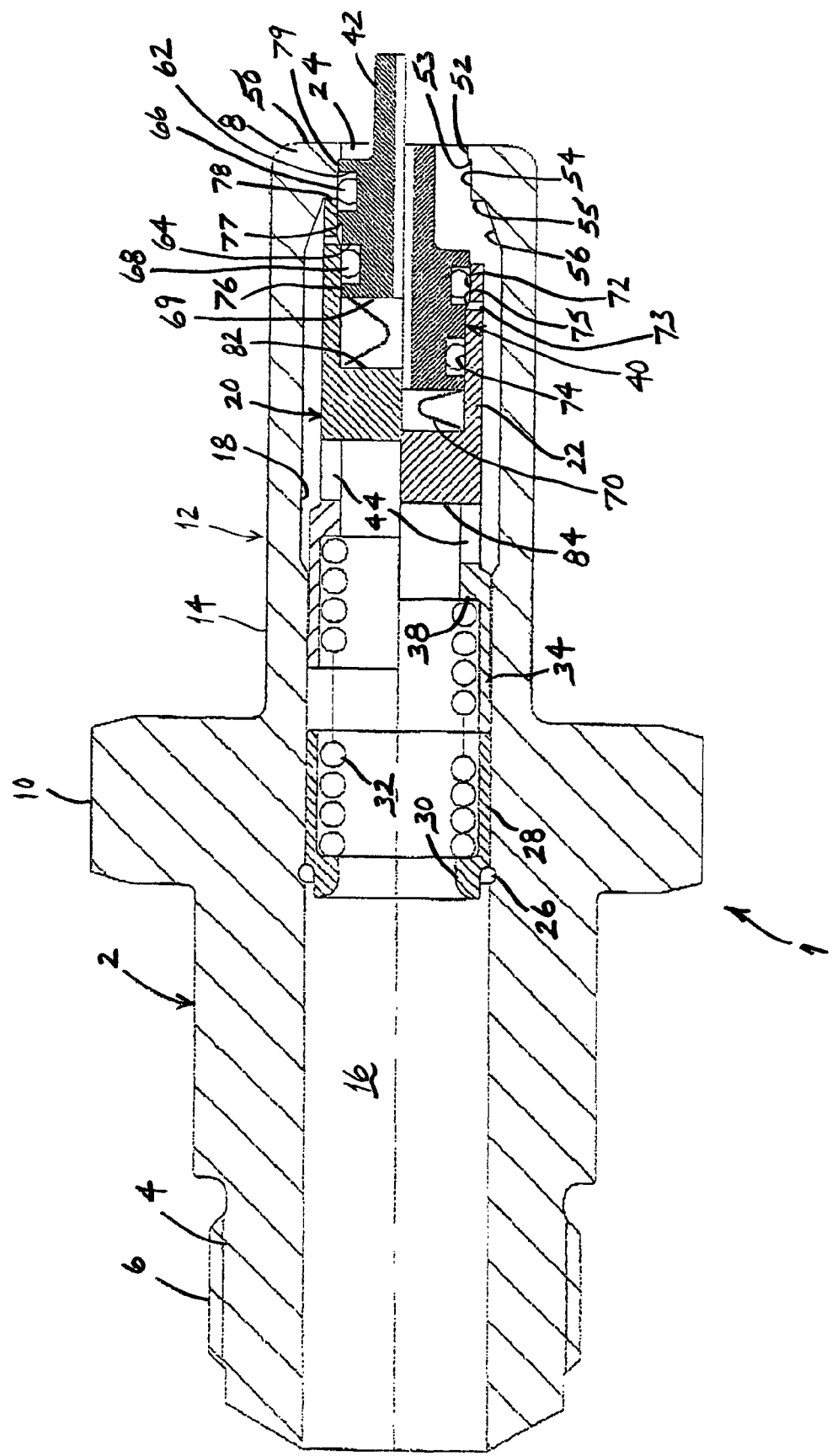

PROTECTION OF A SEAL ELEMENT

BACKGROUND OF THE INVENTION

The present invention relates to a device for protecting the seal element of a valve. More particularly, the invention relates to such a device which prevents the seal element from being displaced and damaged under the influence of a large pressure differential existing across the valve.

Many hydraulic systems comprise component parts, such as valves, which in use are subjected to large pressure differentials. Since these valves are often required to open and close against these large pressure differentials, they must include seals which are able to withstand the large pressure differentials. One problem with existing valves is that high pressure differentials may cause the seal to be displaced from its normal position within the valve, and this may necessitate removing the valve so that the seal can be replaced.

Valves which are used in high pressure applications often comprise hard seals, such as metallic or hard plastic seals. However, such seals will usually not seal properly unless they are energized, i.e., forced against their corresponding sealing surfaces, and this energizing force can sometimes be very high. Moreover, such seals commonly require smaller tolerances and relatively precise machining of their corresponding sealing surfaces. Also, hard seals are usually static and therefore do not withstand being moved, such as when the valve is opened and closed. Consequently, such seals must often be replaced after only a few operations of the valve. However, in many instances this is not always possible or convenient, such as when the valve is located hundreds of meters below the surface of the water.

Another kind of seal which is often used in valves is a soft elastomeric seal, such as an O-ring seal. Elastomeric seals will usually seal much better than hard seals since they will deform against their sealing surfaces. However, these seals tend to be extruded out of their grooves when the valve is opened, a tendency which becomes more pronounced when the pressure differential across the seal increases. Also, when the valve is being opened and the valve member is moving away from the valve seat, ambient pressure will tend to force the seal towards the valve seat and thereby obstruct the passage between the valve member and the valve seat.

Elastomeric seals are commonly used in poppet valves, such as those that exist in the male and female parts of undersea hydraulic couplings. These poppet valves are opened by inserting the male part into the female part. Before the valves are opened, the fluid in one of the parts will be at operational pressure and the fluid in the other part will be at ambient pressure or even zero pressure. Consequently, when the poppet valves first start to open, a large pressure differential may exist which can force the seals out of their corresponding grooves. This pressure differential can also cause the seals to become deformed, and if the seals are thereby neutralized, water may pour through the poppet valves at high speed and tear the seals partially or completely out of their grooves. If this happens, the coupling may have to be brought to the surface for repair.

SUMMARY OF THE INVENTION

In accordance with the present invention, these and other problems in the prior art are addressed by providing a valve which comprises a valve body which includes a passage that extends at least partially therethrough, a valve seat which is positioned in the passage, a valve member which is movably positioned in the passage proximate the valve seat, a first sealing element which is supported on the valve member and which in a closed position of the valve engages the valve seat to block fluid flow through the passage, and a seal protective member which is movably positioned in the passage. The seal protective member is movable relative to the valve member between a first position in which the protective member is engaged with the first sealing element when the valve is in the open position and a second position in which the protective member is retracted from the first sealing element when the valve is in the closed position.

Thus, the valve of the present invention includes a seal protective member which protects the sealing element when the valve is opened but which retracts to allow the sealing element to engage the valve seat when the valve is closed. In this manner, the seal protective member will prevent the sealing element from extruding from its corresponding groove as the valve is being opened. Accordingly, the sealing element is able to withstand large pressure differentials without being damaged.

These and other objects and advantages of the present invention will be made apparent from the following detailed description, with reference to the accompanying drawings.

BRIEF DESCRIPTION OF THE DRAWINGS

The FIG. is a cross sectional view of a male coupling member which comprises the seal protective member of the present invention, with the upper half of the figure showing the male coupling member in its closed position and the lower half of the figure showing the male coupling member in its open position.

DETAILED DESCRIPTION OF THE PREFERRED EMBODIMENTS

The seal protective member of the present invention will be described herein in the context of an exemplary underwater hydraulic coupling. However, it should be understood that the person of ordinary skill in the art will readily appreciate how to modify the seal protective member for use in other kinds of valves.

Referring to the Figure, a hydraulic coupling which comprises the seal protective member of the present invention is shown to include a male part 1 which is arranged to be interconnected with a corresponding female part (not shown) in a manner that is well understood in the art. The male part 1 comprises a tubular body 2 which includes a rear portion 4, a number of external threads 6 which are disposed on the rear portion and via which the body may be attached to a fluid line (not shown), and a suitably shaped gripping portion 10 by which the body may be gripped and screwed into a manifold or the like using an appropriate tool, such as a spanner. The body 2 also comprises a front probe section 12 which includes a cylindrical outer surface 14, a thickened end section 8, and a radially extending front face 50.

The male part 1 also comprises a passage 16 which extends axially through the body 2 and includes an enlarged passage portion 18 which is formed in the probe section 12 and a reduced front passage portion 24 which is formed in the end section 8. The front passage portion 24 is defined by a first section 52 which comprises a first diameter, a second section 54 which comprises a second, larger diameter, and a third section 56 whose diameter diverges towards the enlarged passage portion 18. The front passage portion 24 also includes a first backwards-facing shoulder 53 between the first and second sections 52, 54, and a second backwards-facing shoulder 55 between the second and third sections 54, 56. The surface of the second section 54 forms a valve seat surface, as will be explained in more detail later.

In accordance with the present invention, the male part 1 also comprises a valve retainer 20 which, as will be made apparent below, comprises the seal protective member of the present invention. The valve retainer 20 is axially movable within the passage 16 and is biased toward the front passage portion 24 by a preferably helical spring 32. The spring 32 engages a first spring retaining sleeve 28 which is axially supported in the passage 16 by a spring retainer ring 26. The first spring retaining sleeve 28 includes a radially inward projecting rear support shoulder 30 that forms a rear abutment for the spring 32. The valve retainer 20 comprises a second spring retaining sleeve 34 which includes a radially inward projecting front support shoulder 38 that forms a front abutment for the spring 32. The valve retainer 20 further comprises a number of radial holes or perforations 44 which allow fluid to flow from the passage 16 to the enlarged passage portion 18 and out through the front passage portion 24 when the valve is open.

The front part of the valve retainer 20 comprises a rear end 84 and a forward projecting cylindrical sleeve 22. The sleeve 22 includes a front end 78, a radially extending rear wall 82, a rear inner surface 74, and a front inner surface 72. The front inner surface 72 comprises a larger diameter than the rear inner surface 74 and is separated from the rear inner surface by a radial shoulder 75.

The male part 1 further comprises a valve member 40 which is axially movable within the sleeve 22. The valve member 40 has a rear outer surface 76 and a front outer surface 79 which are separated by a rearward facing shoulder 77. The rear outer surface 76 forms a sliding fit with the rear inner surface 74 of the sleeve 22, and the front outer surface 79 forms a sliding fit with the front inner surface 72 of the sleeve. Furthermore, the shoulder 77 of the valve member 40 engages the shoulder 75 of the sleeve 22 to limit the backward travel of the valve member within the sleeve.

The front end of the valve member 40 comprises an actuator pin 42 that projects through the front passage portion 24 and past the front face 50 of the body 2. An annular spring 70 is positioned in the space between the rear wall 82 of the valve retainer 20 and a rear end 69 of the valve member 40. The spring 70, which is designed to be weaker than the spring 32, exerts a force to keep valve member 40 in its forward position, as shown in the top half of the FIGURE.

The male member 1 also includes a number of soft resilient seal rings, such as O-rings 66 and 68, which are positioned in corresponding grooves 62 and 64, respectively, that are formed in the valve member 40. The O-ring 68 seals against the rear inner surface 74 of the sleeve 22 when the valve is in both the open and closed positions. The O-ring 66 seals against the front inner surface 72 of the sleeve 22 when the valve is in the open position and against the valve seat surface 54 when the valve is in the closed position. A number of holes 73 may be formed through the wall of the sleeve 22 to vent any fluid which may be trapped between the O-rings 66 and 68.

The helical spring 32 is designed to exert a continuous forwardly directed force against the valve retainer 20, and thus the valve member 40, which urges the front end of the valve member 40 into abutment against the shoulder 53. In this position the O-ring 66 seals against the valve seat surface 54 to close the valve. To open the valve, a force is directed against the actuator pin 42 which, since the spring 70 is weaker than spring 32, causes the valve member 40 to move backwards and compress the spring 70 until the shoulder 77 of the valve member 40 engages the shoulder 75 of the sleeve 22. In this regard, since the area of the rear end 84 of the valve retainer 20 is many times larger than the combined areas of the front end 78 and the shoulder 75, the fluid pressure within the passage 16 will help to hold the retainer in place as the valve member 40 is moved.

During movement of the valve member 40, the O-ring 66 will disengage from the valve seat surface 54 and move into contact with the front inner surface 72 of the retaining sleeve 22. However, since the front end 78 of the sleeve 22 remains against the shoulder 55 as the valve member 40 is moving, only a limited amount of fluid can flow past the sleeve. Consequently, the O-ring 66 is protected against the pressure differential which otherwise would try to force the O-ring out of its groove 62 as the valve is opened.

Continued backward movement of the actuator pin 42 will now cause both the valve member 40 and the retainer 20 to move against the force of the spring 32. This movement will cause the front end 78 of the sleeve 22 to move away from the shoulder 55 and thereby establish fluid communication between the passage 16 and the female part of the coupling via the rear retaining sleeve 28, the front retaining sleeve 34, the holes 44, the enlarged passage portion 18 and the front passage portion 24.

The invention presents a pressure assisted closing mechanism comprising the rear end 84 of the valve retainer 20, which is influenced by fluid pressure within the passage 16 to assist in moving the valve retainer toward the closed position of the valve.

As mentioned above, the hydraulic coupling of the present invention also includes a complementary female coupling part which is designed to receive the probe section 12 of the male part 1. The valve member of the female coupling part is otherwise identical to the male part as described above.

As the male and female coupling parts are disconnected from each other, the actuator pins 42 will remain in contact for a period of time. The spring 70 will be kept compressed due to the higher strength of the spring 32 until the front end 78 of the sleeve 22 abuts against the shoulder 55. This stops the forward movement of the valve retainer 20 and closes the fluid path through the coupling. Further disconnecting of the male and female coupling parts will cause movement of only the valve member 40 because of the spring 70. This will cause the O-ring 66 to move into contact with the seat 54, thus forming the desired fluid-tight seal.

Fluid pressure working against the rear of rear spring retaining sleeve 28 will also aid in maintaining this fluid-tight seal. Since the spring 32 is much stronger than the spring 70, the valve retainer 20 and the valve member 40 will move together until the front end 78 of the valve retainer engages the shoulder 55. This will cause the valve retainer 20 to stop while the valve member 40 will be forced further forward by the spring 70. The O-ring 66 will thus move out from under the sleeve 22 and into contact with seal surface 54, thus closing fluid flow through the valve.

The invention will find use in any valve where a valve member must be moved to open a passage between lines with different pressures, where the danger exists that the seal may be forced out of its groove.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. A valve which comprises:

a valve body which includes a passage that extends at least partially therethrough;
a valve seat which is positioned in the passage;
a valve member which is movably positioned in the passage proximate the valve seat;
a first sealing element which is supported on the valve member;
wherein the valve member is movable between a closed position in which the first sealing element is engaged with the valve seat and an open position in which the first sealing element is separated from the valve seat;
a protective member which is movably positioned in the passage adjacent the valve member; and
a spring member which is positioned between the valve member and the protective member and which urges the valve member towards its closed position;
wherein the protective member is movable between a first position in which the protective member is engaged with the first sealing element when the valve member is in the open position and a second position in which the protective member is retracted from the first sealing element when the valve member is in the closed position.

2. The valve of claim 1, further comprising a second sealing element which is supported on the valve member and which is engaged by the protective member in both the open and closed positions of the valve member.

3. The valve of claim 2, further comprising a number of holes which extend through the protective member between the first and second sealing elements.

4. The valve of claim 1, wherein the protective member comprises a cylindrical sleeve portion in which the valve member is slidably supported.

5. The valve of claim 4, wherein the protective member comprises a radial surface which is exposed to fluid pressure in the passage, wherein the fluid pressure acts on the radial surface to urge the protective member towards the valve seat.

6. The valve of claim 4, wherein the sleeve portion includes a front end which in the first position of the protective member extends around the first sealing element and in the second position of the protective member is retracted away from the first sealing element.

7. A hydraulic coupling which comprises:
a tubular body;
an internal passage which extends through the body between a first opening and a second opening;
a valve seat which is formed in a part of the passage proximate the first opening;
a valve member which is positioned within the passage;
a first sealing element which is supported on the valve member proximate the valve seat;
wherein the valve member is movable between a closed position in which the first sealing element is engaged with the valve seat and an open position in which the first sealing element is separated from the valve seat;
wherein the valve member comprises an actuator pin which extends axially through the first opening when the valve member is in its closed position;
a sleeve member which is positioned around at least a portion of the valve member;
wherein the sleeve member is axially movable relative both to the body and the valve member between a first position in which the sleeve member substantially covers the first sealing element and a second position in which the sleeve member is substantially retracted from the first sealing element to thereby enable the sealing element to seal against the valve seat; and
wherein the valve member is moved from its closed position to its open position and the sleeve member is moved from its second position to its first position in response to an external force acting on the actuator pin.

8. The hydraulic coupling of claim 7, further comprising a first resilient member which is positioned between the valve member and the sleeve member to bias the valve member towards its closed position.

9. The hydraulic coupling of claim 8, further comprising a second resilient member which is positioned between the body and the sleeve member to bias the sleeve member towards the valve seat.

10. The hydraulic coupling of claim 9, wherein the force exerted by the first resilient member is less than the force exerted by the second resilient member.

11. In combination with a valve which comprises a body, a flow passage which extends through the body, a valve seat which is formed in a portion of the flow passage, a valve member which is positioned in the flow passage proximate the valve seat and a sealing element which is supported on the valve member, the improvement comprising a protective device for the sealing element which includes:
a valve retainer which is slidably supported in the flow passage and which includes a cylindrical sleeve portion in which the valve member is slidably supported;
wherein the valve member is movable relative to both the body and the sleeve portion between a closed position in which the sealing element is engaged with the valve seat and an open position in which the sealing element is separated from the valve seat;
wherein in the open position of the valve member a distal part of the sleeve portion substantially engages the sealing element and in the closed position of the valve member the distal part of the sleeve portion is substantially disengaged from the sealing element; and
wherein the protective device further comprises a first spring which is positioned between the valve retainer and the valve member and which urges the valve member towards the closed position.

12. The combination of claim 11, wherein the valve retainer is movable relative to the body between a first position in which the distal part of the sleeve portion is engaged with a portion of the body adjacent the valve seat and a second position in which the distal part of the sleeve portion is disengaged from the portion of the body adjacent the valve seat.

13. The combination of claim 12, wherein actuation of the valve member will first move the valve member from the closed position to the open position and then move the valve retainer from the first position to the second position.

14. The combination of claim 12, further comprising:
a second spring which is positioned between the body and the valve retainer;
wherein the second spring urges the valve retainer towards the first position.

15. The combination of claim 14, wherein the force of the second spring is greater than the force of the first spring such that actuation of the valve member will first move the valve member from the closed position to the open position and then move the valve retainer from the first position to the second position.

* * * * *